(No Model.)  2 Sheets—Sheet 1.
R. MEYER.
MEASURING AND INDICATING DEVICE.
No. 516,686. Patented Mar. 20, 1894.
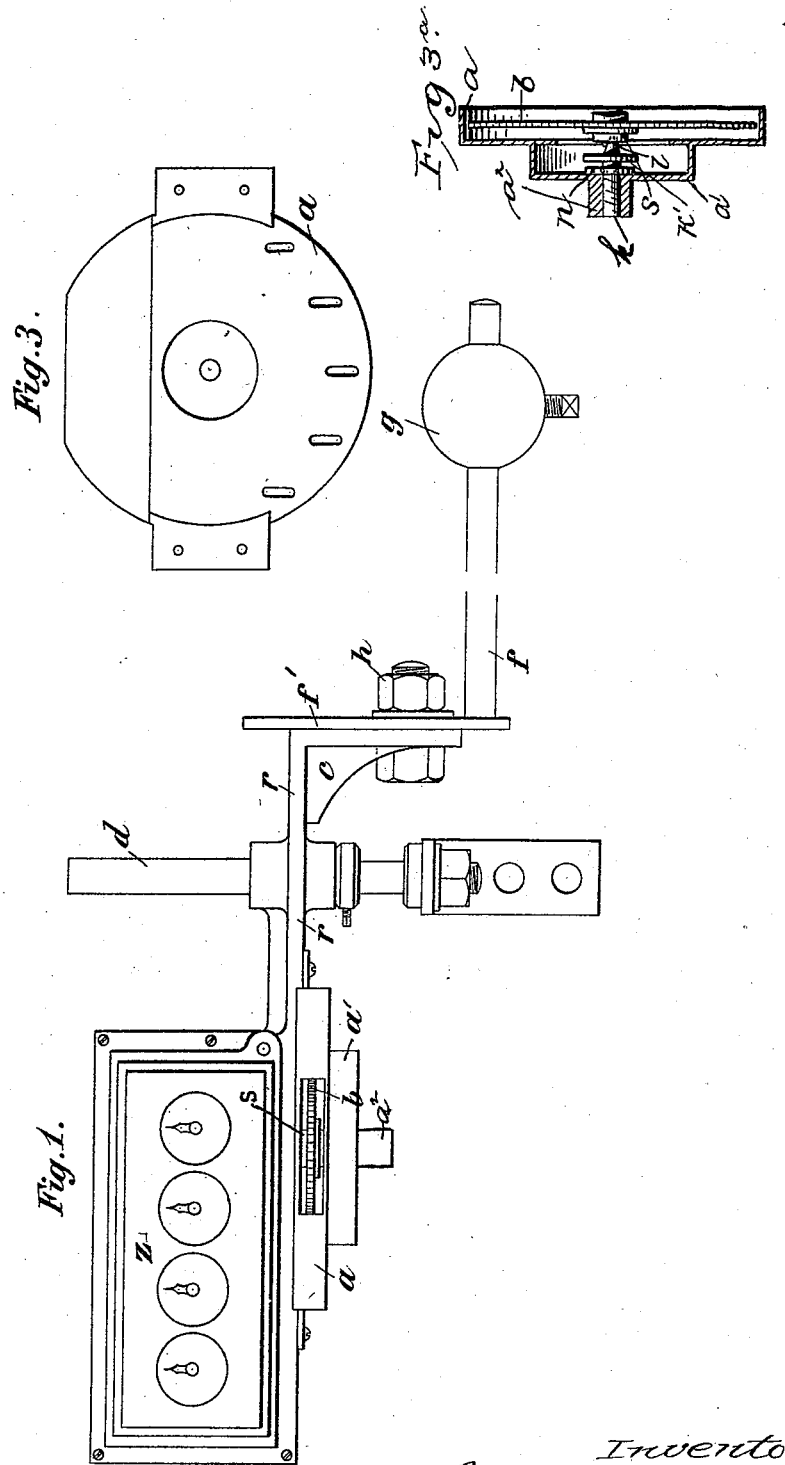
Attest
Walter Donaldson
F. L. Middleton
Inventor
Richard Meyer
by Ellis Spear
Atty.

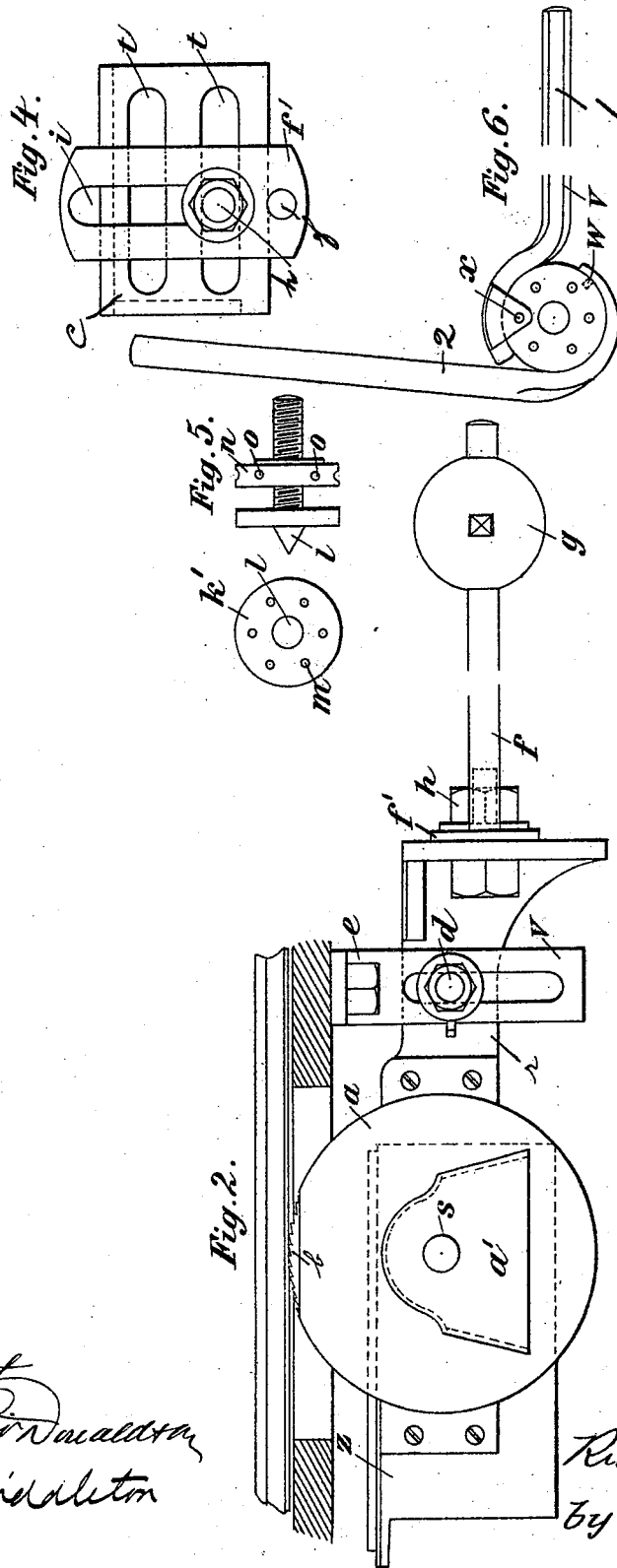

United States Patent Office.

RICHARD MEYER, OF BERLIN, GERMANY.

MEASURING AND INDICATING DEVICE.

SPECIFICATION forming part of Letters Patent No. 516,686, dated March 20, 1894.

Application filed April 15, 1893. Serial No. 470,433. (No model.)

*To all whom it may concern:*

Be it known that I, RICHARD MEYER, of Küstrinerplatz, 9, Berlin, in the Kingdom of Prussia and German Empire, have invented a new and useful Improvement in and Relating to Measuring and Indicating Devices, of which the following is a specification, reference being had therein to the accompanying drawings.

The said invention relates to an apparatus for measuring the length of strips of wood such as laths, moldings and the like automatically.

Prior to my invention, so far as I am aware, measuring devices of this nature have been so constructed that they could be applied only to the upper surface of the material, and they are thus open to the objection that they could be applied only to strips having smooth upper surfaces.

It is the object of the present invention to overcome this defect and to provide a device which may be applied to a wood working machine and arranged to operate in connection with either the upper or lower surface of the strip, or at either side thereof.

The device is more especially adapted however to operate by contacting with the lower face of the strip to be measured and I have shown it as designed for this application in the accompanying drawings, in which—

Figure 1, illustrates a plan view of the apparatus. Fig. 2, is an elevation of the apparatus as applied to a molding or similar machine. Fig. 3, is an elevation of the cover of the notched or serrated contact wheel. Fig. 3ª is a cross section of the cover and cap piece showing the manner of supporting the shaft therein. Fig. 4, is a detail illustrating the form of connection between the counterweight and the frame. Fig. 5, is a detail of the bearing shown in Fig. 3ª, and Fig. 6, is a view illustrating the manner and means employed for loosening and tightening the pivot bearing.

The apparatus comprises a frame $r$, having one end bent to form an angle $c$ to which is secured the counter-weight while the other end carries the measuring parts. These consist of a serrated wheel $b$ adapted to contact with the strip to be measured, and a suitable indicating device $z$ having operating connections with the shaft $s$ of the wheel $b$. The serrated wheel is located within the casing $a$ which has an opening formed by cutting away a portion thereof through which the edge or periphery of the wheel projects slightly as shown in Figs. 1 and 2, so that it may engage and be rotated by the strip to be measured.

The indicating device $z$ may be of the ordinary or any desired construction and need not be described herein.

The angle portion $c$ is provided with two slots $t\,t$ and has connected to it by means of a bolt $h$, the angular portion $f'$ of the arm or rod $f$, which is provided with a slot $i$ through which the bolt passes. An adjustable counter-weight is mounted upon the rod $f$ which tends to keep the serrated wheel constantly in contact with the material to be measured.

The device is secured in any desired position upon the molding or other machine by means of a shaft $d$, upon which the frame $r$ is mounted, which shaft is secured to a bracket $v$ depending from the frame of the machine.

The shaft $s$ is supported within the casing $a$ by an adjustable cone bearing, by means of which it may be adjusted to take up any wear, but in order to prevent adjustment by any unauthorized persons a cap is provided completely inclosing the end of the shaft, and the parts are so arranged that they can be operated only by specially constructed tools. The cap $a'$ is rigidly connected with the casing $a$, and has a cylindrical central extension $a^2$. This central extension is screw threaded upon its interior face to receive the screw $k$ which has a conical inner end engaging a corresponding conical recess in the end of the shaft $s$ thereby supporting the same. The screw is turned to bring it to any desired position by means of a "spanner" $l$ which is inserted through the opening in the lower edge of the cap and is caused to engage with the disk or flange $k'$ (rigidly secured to the screw) by means of a pin $x$ which engages the series of holes in the face of said disk. After the screw has been adjusted as desired it may be locked in position by means of a locking nut $n$ which can be turned to cause it to bear against the inner wall of the cap $a'$. A separate instrument is necessary to turn the locking nut, this instrument being shown at 2 as having a hooked or curved end carrying a pin or projection adapted to engage a series of holes in the periphery of the nut.

Having thus described my invention, what I claim is—

1. A device for measuring traveling strips of lumber comprising a centrally pivoted frame carrying an indicating device on one end, and having an angular extension on the other provided with horizontal slots, a shaft carrying a serrated wheel operating said indicating mechanism, a rod having an angular extension provided with a slot, a bolt passing through said slot and one of the slots in the frame for securing the rod thereto, and a weight longitudinally adjustable on said rod, substantially as described.

2. The combination with the shaft carrying the serrated wheel and the casing having a side opening through which the shaft end projects, of a supplemental casing inclosing said shaft end and having a cylindrical projection from its side and an open bottom, a screw threaded into said cylindrical projection from within the casing and having a conical end adapted to support the shaft end, a collar rigid on the screw for adjusting the same, and a collar threaded on the screw for locking it in its adjusted position, said collars being manipulated, in the normal position of the parts, through the open bottom of the supplemental casing, substantially as described.

In witness whereof I have hereunto set my hand in presence of two witnesses.

RICHARD MEYER.

Witnesses:
PAUL FISCHER,
PAUL GOBERLE.